United States Patent [19]

Tsukioka

[11] 4,246,621
[45] Jan. 20, 1981

[54] ENERGIZING CIRCUIT FOR SOLENOID VALVE

[75] Inventor: Toshio Tsukioka, Yokohama, Japan

[73] Assignee: Yuken Kogyo Company Limited, Fujisawa, Japan

[21] Appl. No.: 924,208

[22] Filed: Jul. 12, 1978

[30] Foreign Application Priority Data

Jul. 15, 1977 [JP] Japan .............................. 52-93437[U]
Feb. 13, 1978 [JP] Japan .............................. 53-15580[U]
Feb. 22, 1978 [JP] Japan .............................. 53-20718[U]

[51] Int. Cl.³ .............................................. H02H 9/04
[52] U.S. Cl. ...................................... 361/56; 361/91; 361/111; 361/159
[58] Field of Search ................. 361/8, 56, 13, 91, 111, 361/6, 3, 118, 119, 127, 159, 160; 338/21

[56] References Cited

U.S. PATENT DOCUMENTS 1,966,077  7/1934  Nyman ..................................... 361/8
3,705,333  12/1972 Galetto et al. ....................... 361/159
3,928,245  12/1975 Fishman et al. ................... 338/21 X

FOREIGN PATENT DOCUMENTS 1387379  3/1975  United Kingdom ..................... 361/56

OTHER PUBLICATIONS

"Engineer's Relay Handbook"-Hayden Book Company, Inc., 1966, pp. 95, 96.

Primary Examiner—Harry E. Moose, Jr.
Attorney, Agent, or Firm—Fleit & Jacobson

[57] ABSTRACT

An engergizing circuit for a solenoid valve has a power source connected to a solenoid coil of the solenoid valve through on-off contacts. The energizing circuit includes a capacitor and a solid-state surge absorber which are respectively connected in parallel with the solenoid coil, and the surge absorber is made from a sintered material containing a metal oxide as a principal component and having a non-linear electric resistance characteristic with respect to the applied voltage. By virtue of the solenoid valve energizing circuit constructed as described, when the on-off contacts are separated, the occurrence of an arc between the contacts thus preventing wear of the contacts, while when the solenoid coil is deenergized, the delay time in the return movement of the valve spool is decreased, and moreover the surge voltage produced across the ends of the solenoid coil upon its deenergization is controlled to a predetermined low voltage.

13 Claims, 32 Drawing Figures

ENERGIZING CIRCUIT FOR SOLENOID VALVE

BACKGROUND OF THE INVENTION

The present invention relates to energizing circuits for solenoid valves, and more particularly the invention relates to an improved energizing circuit whereby when the supply of current to a solenoid valve is frequently turned on and off to frequently change the positions of the valve spool, the contacts for turning on and off the current supply are prevented from being damaged by arc discharge, and more particularly the surge voltage generated across the solenoid coil of the solenoid valve during the off period of the current supply is suppressed and the delay time in the return movement of the valve spool upon deenergization of the solenoid coil is reduced.

With a known type of solenoid valve in which current is supplied to a solenoid coil to move a valve spool against a flow force and spring force, if a switch with contacts, e.g., relay is used to interrupt the supply of current to the solenoid coil, arc discharge will be caused between the switch contacts, with the result that the life of the contacts is reduced extremely due to wear and loss of the contacts and the contacts are held in an incompletely parted condition by an arc current during the period of the arc discharge, thus causing a residual magnetic force in the solenoid coil by the current continuously flowing in the solenoid coil and thereby retarding the return movement of the spool until the residual magnetic force becomes smaller than the spring force. As a result, the change-over time of the valve will be increased thus causing a delaying phenomena. Also, immediately after the contacts have parted, a surge voltage which is several tens times the normal voltage (differing in dependence on the parting speed of the contacts) will be induced across the solenoid coil thus causing troubles, such as, dielectric breakdown of the solenoid coil or electric noise which disturbes other devices, particularly communication devices in the neighborhood.

In the past, many different measures have been proposed to prevent the occurrence of surge voltage across the solenoid coil or the occurrence of arc discharge between the contacts upon interruption of the current supply to the solenoid coil, and all of these proposed measures are of the alternative nature in that in some measures the prevention of sparks between the contacts is accompanied with an increased delay time in the return movement of the spool upon deenergization of the solenoid coil and in another measures the suppression of surge voltage is accompanied by the occurrence of spark between the contacts and an increased delay time in the return movement of the spool. For instance, a measure is known in the art in which a diode is connected in parallel with a DC solenoid coil in opposite polarity so that the voltage induced in the coil upon opening of the contacts is discharged through the diode, that is, the surge voltage produced across the solenoid coil is suppressed by the continuity of the current flow thus extinguishing the spark produced between the contacts, and this measure is disadvantageous in that although there occurs no spark of the order that can be observed visually, there actually occurs spark of the order sufficient to cause wearing of the contacts and moreover the delay time in the return movement of the valve spool is several times that obtained without using the diode.

On the other hand, another measure is known in which the ordinary varistor whose electric resistive element is mainly composed of intergranular point contacts, such as, SiC varistor is connected in parallel with a solenoid coil so as to absorb the surge voltage at a certain voltage value, and this is also disadvantageous in that in the case of a large power coil, such as, the coil of a solenoid valve, a very large back electromotive force will be generated upon the interruption of current flow with the result that it is impossible to extinguish a spark produced between the contacts by simply absorbing only that part of a high voltage of a narrow waveform which is higher than a certain voltage value and the delay time in the return movement of the valve spool remains as long as is the case without connecting the varistor.

Still another measure is known in which a capacitor is for example connected in parallel with a solenoid coil so that the back electromotive force produced upon deenergization of the coil is cancelled by the charge stored in the capacitor, and this is also disadvantageous in that the capacitor must have a capacitance value of a certain measure to prevent the occurrence of spark between the contacts and that the capacitance value of the capacitor must be large in order to suppress the surge voltage to a certain value. For example, in the case of a DC solenoid valve having a rated voltage of 24 V, if it is desired to suppress the surge voltage across the coil to 150 V, a capacitor having a relatively large capacitance of several tens $\mu F$ must be used to produce the desired effect, that is, if a capacitor having for example a capacitance value of 1 $\mu F$ is used, a surge voltage of the order of 1,000 V will be produced across the coil upon deenergization of the coil. Since voltages of opposite polarities will be applied across the capacitor during the supply of current to the coil and immediately after the interruption of the current supply, respectively, the capacitor must be a nonpolarized capacitor with the result that it is difficult to obtain inexpensively a nonpolarized capacitor of a large capacitance and it is necessary to use a large capacitor which is difficult to use as a built-in component part around the valve. Further, since a capacitor of a large capacitor must be used, when current is supplied to a solenoid coil, a large rush current flows to the capacitor and consequently such rush current cannot be ignored in cases where a plurality of solenoid coils are energized from the same power source.

Thus, with the ordinary solenoid valve, in order to change the passages for a large pressure or large flow, the spring force of a spool return spring must be selected large to change the passages upon deenergization of the solenoid coil and the flow force also increases. As a result, the attractive force of a solenoid must be large to overcome such large opposing forces and it is necessary to use a large solenoid coil, thus inevitably increasing the ampere turns and causing upon interruption of the current supply a back electromotive force which is extremely large with those of other coil devices. Consequently, if the current supply is interrupted by a contact-type switching device such as relay, many peculiar problems will be caused, namely, the contacts will generally be made inoperative after the expiration of about one half the rated life of the switching device, not only the delay in the opening of the contacts but also the delay in the return movement of the valve spool must be taken into consideration, and so on.

On the other hand, while it is essential to guarantee a life over a long period of time for hydraulic equipment used as industrial equipment, there are many cases where such hydraulic equipment is incorporated in one unit along with an electric component, such as, electric motor, relay or timer which controls the operation of the hydraulic equipment, with the result that the electric component is considered as a part of the hydraulic equipment and it is necessary to guarantee a life for the unit in consideration of the hydraulic equipment as well as the electric component. However, with the electric components other than electric motors, such as, relays and timers, generally the life of their contacts, etc., is short as compared with that of the hydraulic equipment so that presently it is the usual practice to select a relatively short guaranteed life in consideration of the short life of the electric component or alternatively a life is guaranteed in consideration of the relatively long life of the hydraulic equipment and the replacement of a relay or the like without cost is made obligatory within the guaranteed period.

SUMMARY OF THE INVENTION

It is a principal object of the present invention to provide an energizing circuit for a solenoid valve which is simultaneously capable of reducing the delay time in the return movement of the valve spool upon deenergization of the solenoid coil, preventing wearing of the current on-off contacts due to arc and suppressing the surge voltage induced in the solenoid coil upon deenergization of the coil.

It is another object of the present invention to provide an energizing circuit for a solenoid valve wherein the maximum voltage of the circuit is limited by suppressing the induced surge voltage lower than a predetermined voltage value, and a light emitting diode having a relatively low reverse withstand voltage is used as an actuation indicator lamp.

It is still another object of the present invention to provide an energizing circuit for a solenoid valve which is composed of small component parts and thus can be incorporated in a solenoid valve as an electric component part of the valve.

In accordance with the present invention, there is thus provided an energizing circuit for a solenoid valve in which a power source is connected to the solenoid coil of a solenoid valve through on-off contacts, and a capacitor and a solid-state surge absorber composed of a sintered material essentially comprising a metal oxide and having a non-linear electric resistance characteristic with respect to the applied voltage are respectively connected in parallel with the solenoid coil.

The surge absorber comprises a solid-state element composed of a sintered powder material containing a metal oxide, e.g., ZnO as an essential component and small amounts of additional impurities, so that its surge absorbing capacity is such that it absorbs current ten times or over as compared with other surge absorbing devices such as SiC varistors, selenium varistors, silicon diodes and Zener diodes and it also constitutes a non-linear resistive element whose non-linear characteristic of the applied voltage with respect to the discharge current has a non-linear coefficient of over 4 to 6 times that of SiC varistors and selenium varistors.

In the past, as mentioned previously, the overvoltage absorbing devices of the above type include SiC varistors, selenium varistors, silicon varistors, Zener diodes, etc., which make use of the non-linear voltage (V)—current (I) characteristic ($I \sim V^\alpha$, $\alpha > 1$ and the degree of the non-linearity is given by the index $\alpha$), and these devices are so designed that when the applied voltage is lower than the ordinary applied voltage, a high resistance is presented to reduce the flow of current in the device, and when an overvoltage is applied the resistance value is decreased rapidly to absorb a large current. With the SiC varistors and selenium varistors, however, the non-linearity index $\alpha$ is not so large that the clamping voltage for absorbing surge is increased, with the result that the surge voltage induced in the solenoid coil upon deenergization of the solenoid coil cannot be suppressed to a low value and moreover the surge absorbing capacity is not sufficient for use with the solenoid coil of the ordinary solenoid valve, thus making it impossible to effectively prevent the occurrence of arc between the current on-off contacts. On the other hand, while silicon varistors and Zener diodes have very high non-linearity indexes, these devices are capable of absorbing only small surge energy and moreover it is difficult to manufacture devices which withstand high applied voltage. Thus, these devices are usable only with low voltage circuits of the order of ten odds volts and they are in no way usable with the solenoid valves.

The above-mentioned surge absorbers used with this invention is a solid-state device comprising a sintered powder material composed mainly of a metal oxide such as ZnO. For example, while a sintered material of powdered ZnO is essentially an N-type semiconductor having a relatively low resistance, in the case of zinc oxide ceramic surge absorbers produced by adding some different metal oxides, such as, rare earth oxides or cobalt oxide to powdered ZnO and then sintering the mixture (e.g., Z-TRAP's manufactured by Fuji Electric Co., Ltd. of Tokyo Japan), an insulating layer is formed at the grain boundary of each of the ZnO crystal grains constituting the sintered material, and this insulating layer serves as a potential barrier thus causing the electric resistance of the sintered material to exhibit a non-linear characteristic. In other word, a solid-state surge absorber composed of such sintered material has a far greater effective cross-sectional area for absorbing passing surge current and hence a greater surge absorbing capacity than in the case of SiC varistors in which the electric resistance is privided by the point contact between the grains. Further, the voltage applied to the sintered material is shared by the grain boundary layers which are equal in number to the number of the crystan grains connected in series, and the resulting clamping voltage is higher than that of Zener diodes in which the applied voltage is borne at a single junction. Furthermore, since the surge absorber composed of such sintered material has a non-linearity index $\alpha$ of as high as 30 and hence a non-linear voltage characteristic which is over several times that of SiC varistors, since the leakage current is on the order of $\mu A$ or less, since the clamping voltage is low and excellent in stability as compared with the ordinary varistors and since the response to surge is as fast as 1 $\mu$sec or less, it is possible to absorb surges of the sharp pulse waveform and moreover its essentially symmetrical voltage-current characteristic permits absorption of surge voltages of both positive and negative polarities and also makes the device well suited for use in both AC and DC applications. With this surge absorber, when the applied voltage exceeds a certain value, the resistance decreases rapidly and a large current is discharged. When it is desired to use such surge absorber in combination with a solenoid coil, a surge absorber having a specified clamping voltage is selected in consideration of the rated voltage of the solenoid coil and the maximum circuit applied voltage, and in this case only the clamping voltage of the absorber is allowed to appear in the circuit no matter how high is the surge voltage induced in the solenoid coil upon deenergization of the solenoid value.

A capacitor of a proper capacitance value is used to suit the inductance of the solenoid coil, and it has been found that the desired contact wearing preventing effect can be achieved with a capacitor of about 0.01 $\mu$F or over and that the occurrence of arc discharge between the contacts can be eliminated with a capacitor of 0.3 $\mu$F or over. Also, as mentioned previously, the capacitor should preferably be a nonpolarized capacitor and it is preferable that the capacitor has a withstand voltage which is higher than the specific clamping voltage of a surge absorber and that the capacitor is a small capacitor having excellent moisture and chemical resistance and reduced deterioration with age to meet the use conditions required for the stable operation of the hydraulic solenoid valve as an installed equipment over a long period of time.

When the current supply to the solenoid coil is interrupted, the inductance of the solenoid coil is changed moment by moment as the movable core of the solenoid valve is returned by a spring from the position at which the movable core is attracted to the stationary core of the solenoid coil toward the neutral position at which the displacement of the solenoid valve spool is zero. As a result, a large surge voltage is produced by the total sum of back electromotive forces produced by momentarily changes in the inductance due to changes in the current over a short period of time. In accordance with the present invention, by suitably selecting the capacitance value of the capacitor with respect to the inductance (though there is the resistance component, too), a resonant oscillation circuit which is peculiar to L, C and R is provided and the surge voltage from the coil is cancelled by the charge on the capacitor irrespective of the opening speed of the current supply on-off contacts, thus eliminating arc discharge.

In other words, the capacitor stores a charge by being charged in one polarity by a current supplied from the power source upon starting the current supply, and upon starting the interruption of the current supply the charge is increased further by a back electromotive force generated from the solenoid coil in a direction to prevent decrease in the charge from the instant that the current on-off contacts start opening until several $\mu$sec elapse, allowing the contacts to separate completely during this time interval. In this way, the contacts are separated without causing any arc while the back electromotive force is being stored as a charge in the capacitor. Thereafter, the movable core still continues to move toward the neutral position of the spool and the back electromotive force is continuously produced by the momentarily changes in the inductance valve. Thus, all the back electromotive forces in excess of the storage capacity of the capacitor result in a surge voltage which is developed across the solenoid coil in the form of a high voltage having a narrow waveform, and this high voltage is clamped by the surge absorber to its specified clamping voltage, thus attaining the object of this invention.

In accordance with this invention, since the delay time in the return movement of the valve spool upon deenergization of a solenoid valve can be reduced, if the invention is incorporated in a solenoid valve used in hydraulic equipment such as an injection machine for plastic material, it is possible to reduce the overall injection molding cycle time and perform high speed repeated operations. In addition, the variation of the delay time in the spool return movement can be reduced with the resulting elimination of defective molded parts, and the life of current on-off relay contacts, for example, can be greatly increased by preventing the occurrence of arc. This increased contact life allows to offer a longer guaranteed life for a unit of hydraulic equipment which incorporates a solenoid valve and an electric component such as a relay for energizing and deenergizing the solenoid valve. Also, by virtue of the prevention of arc discharge between the contacts, the selection of a relay or the like may be made by mainly considering the current supplied to the solenoid coil but disregarding the interrupting capacity, and consequently instead of a large-current power relay which has heretofore been used, a small relay such as a signal transmission relay may be used to meet the requirements, thus making it possible to incorporate the relay in a printed circuit-board and thereby making the control panel compact and smaller.

Still another advantage of the invention is that since the surge voltage induced in the solenoid coil of a solenoid valve upon deenergization can be suppressed below a predetermined value, instead of connecting in series a plurality of high reverse withstand voltage diodes each having a recurrent peak reverse withstand voltage of over 1,000 V as is known in the art, a diode having a low reverse withstand voltage of several hundreds volts, for example, may be used with a light emitting diode as an actuation indicating circuit in consideration of the clamping voltage of a surge absorber and there is no danger of the light emitting diode being broken. The present invention has many other practical advantages, such as, the provision of surge suppressing effect for a solenoid coil itself, the use of a small capacitor as a parallel-connected capacitor owing to decrease in the required capacitance and withstand voltage, the incorporation of these components as electric component parts in the body of a solenoid valve and so on.

The present invention both as its detailed construction and additional advantage will be best understood from the following description of specific embodiments taken in conjunction with the accompanying drawings.

BRIEF DESCRIPTION OF THE DRAWINGS

FIGS. 4c, 4d and 4e are circuit diagrams showing modified forms of the energizing circuit for DC solenoid valve according to the embodiment of FIG. 4a.

FIGS. 5b, 5c and 5d are circuit diagrams showing modified forms of the energizing circuit for DC solenoid valve according to the embodiment of FIG. 5a.

FIGS. 6b, 6c and 6d are circuit diagrams showing modified forms of the energizing circuit for DC solenoid valve according to the embodiment of FIG. 6a.

FIGS. 7b, 7c, 7d and 7e are circuit diagrams showing modified forms of the energizing circuit for AC solenoid valve according to the embodiment of FIG. 7a.

FIG. 8b is a circuit diagram showing a modified form of the energizing circuit for AC solenoid valve according to the embodiment of FIG. 8a.

FIGS. 9b, 9c, 9d, 9e, 9f, 9g and 9h are circuit diagrams showing modified forms of the energizing circuit for AC solenoid valve according to the embodiment of FIG. 9a.

DESCRIPTION OF THE PREFERRED EMBODIMENTS

Figure 1:
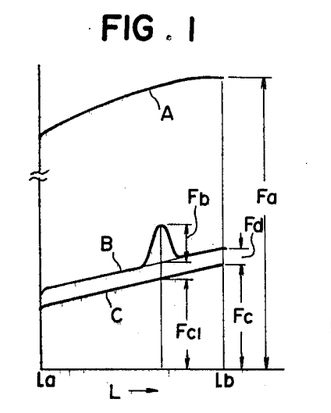
FIG. 1 is an exemplary characteristic diagram showing a solenoid attraction characteristic (A), flow force characteristic (B) and spring force characteristic (C) in relation to the displacement of the spool of a DC solenoid valve, in which the abscissa represents the displacement (L) of the spool and the ordinate represents the force (F).

When a DC solenoid valve is moved from one position to another, the relationship between the solenoid coil attraction characteristic and the spring force and the flow force is such that in the case of a solenoid valve of the type in which all the ports are for example blocked under the neutral condition where the solenoid coil is deenergized, as shown in FIG. 1, when the valve spool is moved from a neutral position La to an operated position Lb, the solenoid attraction characteristic (A) increases with decrease in the gap between the movable core and the stationary core and the flow force (B) attains a peak value Fb at a certain spool position. The spool position at which the flow force rises and the following spool position at which the peak value is generated are not changed by a change in the rate of pressure flow within the valve and they are fixed in dependence on the structural relationship between the valve body and the spool. In the Figure, symbol C designates the spring characteristic of a spring which applies to the spool a spring force opposing the solenoid attractive force, and the spring is adapted so that at the neutral position the spring has already been yielded storing a certain force and the spring force is increased with the displacement of the spool. With the spool moved from the neutral position La to the operated position Lb by the energization of the solenoid coil, when the current supply to the solenoid coil is interrupted to return the spool to the neutral position, the time interval from the instant that the contacts of a relay or the like are parted until the spool is returned to the neutral position, i.e., the return delay time varies in dependence on the manner in which the change of the deenergization of the solenoid coil with time responds to the opening of the contacts. While the spool will be returned to the neutral position by the spring force Fc when the current supply to the solenoid coil is interrupted to eliminate the attractive force Fa, in the case of the previously mentioned valve of the type in which all the ports are blocked under the neutral condition, the returning force is the sum of the spring force Fc and the flow force Fb minus the sliding friction Fd of the spool, and in the case of a valve of the other type in which all the ports are opened under the neutral condition the flow force Fb is not added but subtracted and consequently the spool is returned to the neutral position by a force (Fc−Fb−Fd). In either of these types, if the contacts are caused to open gradually by arc discharge of if a diode of opposite polarity is connected in parallel with the solenoid coil so that the back electromotive energy in the solenoid coil is attenuated gradually by the circulating current flowing in the closed circuit formed by the opposite polarity diode and the solenoid coil, a residual attractive force which is very close to the maximum attractive force Fa of the solenoid coil remains permanently and consequently the return movement of the spool is delayed until the restoring force overcomes the gradually decreasing residual attractive force. Particularly, in the case of the valve of the latter type, the restoring force is further decreased by the flow force so that the return movement is delayed considerably and there are cases where the return movement of the spool will be made impossible.

Figure 2A:
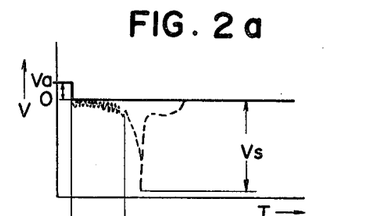
FIGS. 2a and 2b are diagrams showing respectively the change with time of the coil terminal voltage (V) and the change with time of the spool displacement (L) upon deenergization of a prior art DC solenoid valve, with the ordinate in FIG. 2a representing the voltage (V), the ordinate in FIG. 2b representing the displacement (L) and the abscissas in FIGS. 2a and 2b showing the time (T).
Figure 2B:
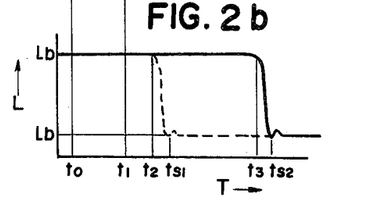

FIGS. 2a and 2b are graphs showing respectively changes in the voltage across a solenoid coil and the displacement of the spool in relation to the lapsed time when relay contacts connected in series with the solenoid coil are opened at a time $t_0$. In the Figures, the solid lines represent the cases where a capacitor and an opposite polarity diode are connected in parallel with the solenoid coil, and the dotted lines represent the cases where the solenoid coil is used alone without any additional components. With the spool being held in the position Lb by the solenoid energized by a steady state voltage V, when it is desired to return the spool to the neutral position La by opening the contacts at the time $t_0$, if no components are connected to the solenoid coil, in response to the energization at the time $t_0$ of the relay to open the contacts an arc discharge is caused between the contacts until a time $t_1$ and during this time interval the solenoid coil is continuously energized by the resulting arc current. This time interval $t_0 - t_1$ is increased with an increase in the applied voltage of the solenoid, and during this time interval the spring force is overcome by the solenoid residual attractive force opposing the spring force, thus causing the spool to stay in the position Lb. After the time $t_1$ or after the arc discharge has been cut off by the contact opening action of the relay, firstly, a surge voltage which is several tens times the steady state voltage is induced in the circuit so that the spool is caused by the spring force to start moving toward the position La only at a time $t_2$ at which the gradually decreasing residual attractive force is overcome by the spring force and the return movement is completed at a time $t_{S1}$. While the time intervals $t_1-t_2-t_{S1}$ represent electrical and mechanical transient states which exist inevitably, the previously mentioned time interval $t_0-t_1$ is a waste delay time caused by the arc discharge. In addition, the surge voltage is a large voltage which will be over 300 V in the case of a 12−V solenoid coil and near 600 V in the case of a 24−V solenoid coil, and moreover the surge voltage is in the form of a sharp pulse voltage, thus tending to cause dielectric breakdown in the solenoid coil, ill effects on the adjacent equipment by impulse noise, etc.

On the contrary, where a capacitor and an opposite polarity diode are respectively connected in parallel with the solenoid coil, when the relay is energized at the time $t_0$, the contacts immediately start to open and the back electromotive force induced in the solenoid coil flows as a current into the capacitor which has been charged by the supply voltage. As a result, the current charges the capacitor in the opposite direction and in this way the current is absorbed for a fixed time which is dependent on the capacity of the capacitor, thus allowing the contacts to open completely without arc discharge. Thereafter, when the point is reached where the back electromotive force attains a voltage value sufficient to bias the diode in the forward direction, the diode provides a short-circuit closed circuit for the solenoid coil so that the current flowing in the closed circuit decreases gradually and the current flow eventually diminishes, thus causing no surge voltage. The residual attractive force which gradually decreases with gradual decrease in the current flow, usually becomes lower than the spring force of the valve later than the previously mentioned time, so that the valve spool starts moving toward the position La only at a time $t_3$ and the return movement is completed at a time $t_{S2}$. While the time interval $t_3-t_{S2}$ is equal to the time interval $t_2-t_{S1}$, by virtue of the fact that the capacitor and the diode are connected in parallel with the solenoid coil so as to prevent the occurrence of spark between the contacts and the occurrence of surge voltage, usually there is caused the delay time $t_0-t_3$ of the order of 20 to 30 m sec which is longer than the delay time $t_0-t_2$, and in the case of the ordinary solenoid valve the corresponding delay time will be about 100 m sec.

Due to the existence of this delay time, the solenoid residual attractive force which decreases gradually during this delay time opposes the spring force or restoring force and the difference between the spring force and the solenoid residual attraction tends to retard further or make impossible the return movement of the spool in dependence on the return flow force.

Figure 3:
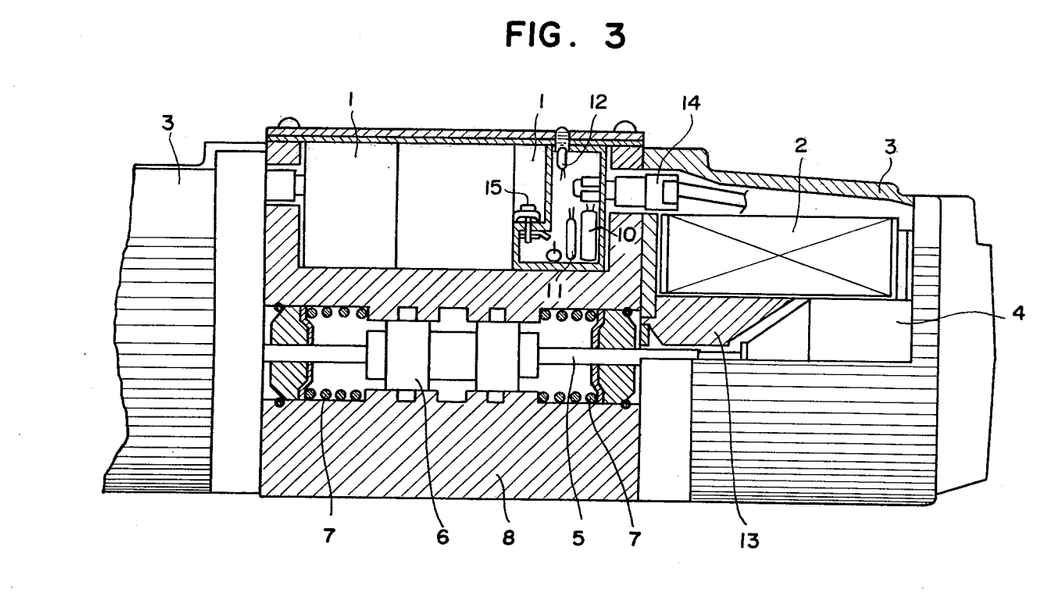
FIG. 3 is a partial sectional schematic diagram showing the construction of a DC solenoid valve incorporating an energizing circuit according to an embodiment of the invention.
Figure 4A:
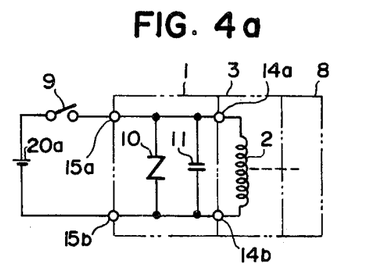
FIG. 4a is an electric circuit diagram showing a DC solenoid valve corresponding to FIG. 3 along with an energizing circuit according to an embodiment of the invention.

Referring now to FIG. 3, there is illustrated a DC solenoid valve incorporating an energizing circuit according to an embodiment of the invention. In the Figure, a valve body 8 includes a spool 16 which is balanced and positioned at the neutral position by springs 7,7, and a movable core 4 of a solenoid 3 is pressed against one end of the spool 6 through a push pin 5. A solenoid coil 2 is arranged around the movable core 4 and a stationary core 13 so that when the solenoid coil 2 is energized, the movable core 4 is attracted to the stationary core 13. Numeral 1 designates a terminal box which is received in a recess in the upper portion of the valve body 8, so that the terminal box 1 is connected to the coil 2 of the solenoid 3 through a connector 14 and its another connecting terminal 15 is connected to the leads from a control power source including a contact-type switching device such as relay. As shown in FIG. 4a, the terminal 15 and the connector 14 respectively comprise a pair of terminals 15a and 15b and a pair of connector terminals 14a and 14b, and a surge absorber 10 composed of the previously mentioned sintered material and a capacitor 11 are respectively connected in parallel with the solenoid coil 2. This parallel circuit is connected between the terminals 15a, 15b and 14a, 14b and is received in the terminal box 1. The terminals 15a and 15b are connected to a DC control power source 20a through switch contacts 9 which are opened and closed to energize and deenergize the solenoid coil 2 connected to the terminals 14a and 14b. The capacitor 11 and the surge absorber 10 need not always be disposed in the terminal box 1. The surge absorber 10 is extremely sensitive to a change in the applied voltage so that when the applied voltage is lower than a predetermined value it presents a high resistance and practically no current flows, and when the applied voltage is higher than the predetermined value the resistance drops rapidly and a large current is discharged. With the combination of the surge absorber 10 and the solenoid coil 2, the absorber 10 having a specified clamping voltage selected in consideration of the solenoid rated voltage and the maximum circuit applied voltage is used, and consequently when the solenoid valve is deenergized only the clamping voltage of the absorber 10 appears in the circuit no matter how high is the surge voltage generated in the solenoid coil 2.

The capacitor 11 has a suitable capacitance value selected in consideration of the inductance value of the solenoid coil 2, and it has been found that in the case of the ordinary solenoid, the desired contact wearing preventing effect can be attained with a capacitor of about 0.01 $\mu$F or over and the occurrence of arc discharge between the contacts can be completely prevented with a capacitor of 0.3 $\mu$F or over. Also, as will be seen from FIG. 2a, the capacitor 11 should preferably be a nonpolarized capacitor and its withstand voltage should be selected higher than the clamping voltage of the surge absorber 10. For example, as regards the withstand voltage of the capacitor 11, a capacitor having a withstand voltage of 200 to 250 V will be sufficient if it is used in combination with a DC solenoid valve having a rated voltage of 24 V and the surge absorber 10 having a clamping voltage of 150 V.

Figure 4B:
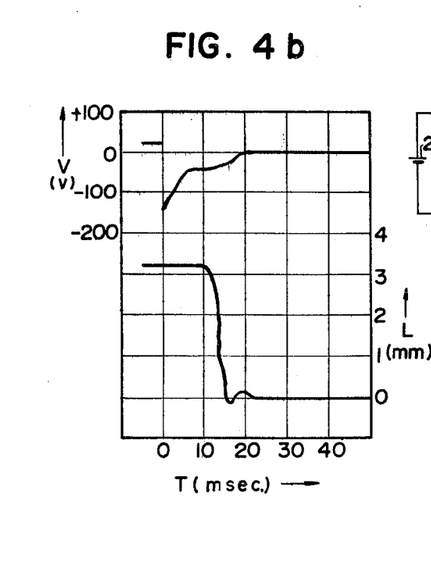
FIG. 4b is a graph showing the results obtained by actually measuring the change with time of the coil terminal voltage (V) and the spool displacement (L) of a deenergized DC solenoid valve incorporating the circuit construction of FIG. 4a, with the ordinate representing the voltage (V) the volts and the displacement (L) in mm with the spool neutral position being taken as 0 and the abscissa representing the time (T) or the lapsed time in m sec from the time instant of interrupting the current supply which was taken as 0.

FIG. 4b is a graph showing the results obtained by measuring with a memory scope the changes in the voltage across the solenoid coil and the displacement of the spool with time by using the surge absorber 10 composed of a ZnO-type sintered material and having a clamping voltage of 150 V, the capacitor 11 consisting of a non-polarized capacitor having a capacitance of 0.3 $\mu$F and withstand voltage of 250 V and the DC solenoid voltage with a rated voltage of 24 V and by deenergizing the DC solenoid valve. In this case, the relay used had the maximum rating with an interrupting current of 2.4 A and the service life of over 500,000 times and the relay was subjected to 3,000,000 times of repeated on-off test. When the tests were completed, the relay contacts showed no irregularity and the properties of relay were the same as the relay was just off the shelf. As will be seen from FIG. 4b, the voltage across the coil was suppressed to the maximum voltage of 150 V and the spool was returned to the neutral position in 15 m sec from the opening of the contacts, thus practically eliminating the delay. On the other hand, the similar off-period characteristic measurement was made by connecting a series circuit of a diode of opposite polarity and a resistor of 22 ohms in parallel with a solenoid coil, and it was found that although the surge voltage was reduced to as low as 25 V, there occurred a slight spark between the contacts and the return time of the spool was as long as 55 to 65 m sec. When the resistor was removed and only the diode was used, a longer time of 110 to 120 m sec was required to complete the return movement. When only the capacitor was connected in parallel with the coil, the surge voltage generated was as high as about 1,000 V and there was the occurrence of spark between the contacts.

Figure 4C:
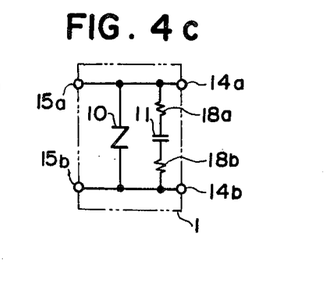

While, in the embodiment shown in FIG. 4a, the capacitor 11 and the surge absorber 10 are respectively directly connected in parallel with the solenoid coil 2, as for example shown in FIG. 4c, low resistors 18a and 18b each having a resistance value of several ohms may be connected in series with the ends of the capacitor 11, and in this way the rush current caused upon starting the current supply can be reduced in cases where a large number of solenoid coils are connected to the same power source.

Figure 4D:
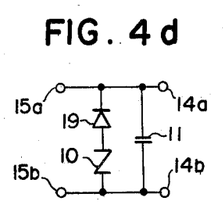
Figure 4E:
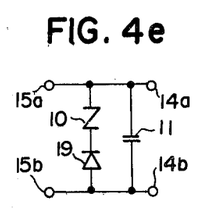

Reference is now made to FIGS. 4d and 4e. While, with the circuit shown in FIGS. 4a or 4c, the surge absorber 10 used must have a higher operating voltage in order to subject the solenoid coil 2 to on-off control with a higher circuit applied voltage, e.g., power supply voltage of 100 V or over, it will be made possible to use a surge absorber having an operating voltage lower than the load voltage by connecting a diode 19 in series with the surge absorber as shown in FIG. 4d or 4e. In other words, by inserting the diode 19 in such a manner that the supply voltage is not applied but only the surge voltage is applied to the surge absorber 10, it is possible to clip the back electromotive force from the load 2 at a voltage value of an absolute value which is lower than the supply voltage. While, in FIG. 4d, the diode 19 has its cathode connected to the terminals 15a and 14a which serve as positive terminals when the contacts are closed and its anode connected to the surge absorber 10, the diode 19 and the surge absorber 10 may be connected in the reverse manner as shown in FIG. 4e.

With the above-mentioned embodiment circuits, since the voltage appearing in the circuit is lower than the specified clamping voltage of the surge absorber 10 under all conditions, it is possible to use a low withstand voltage diode to connect in series with the light emitting diode for indicating the condition in which the current is being supplied to the solenoid coil 2.

Figure 5A:
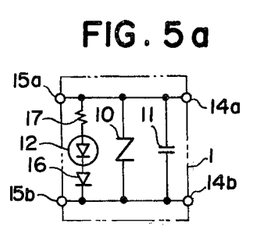
FIG. 5a is a circuit diagram showing an energizing circuit for DC solenoid valve according to another embodiment of the invention.

FIG. 5a shows another embodiment of the invention which differs from the embodiment of FIG. 4a in that a light emitting diode is added to the circuit of FIG. 4a, namely, a series circuit of a resistor 17, light emitting diode 12 and diode 16 is connected between the terminals 15a and 15b. Of course, the light emitting diode 12 may be incorporated in the terminal box 1 to project light to the outside as shown in FIG. 3. In the Figure, the light emitting diode 12 is lighted by the current from the DC power source only when the current is being supplied to the solenoid coil 2.

Figure 5B:
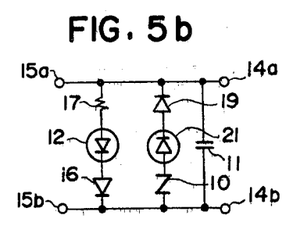

With the above-mentioned embodiments, the resistance of the surge absorber 10 drops to a low value while the back electromotive force from the solenoid coil 2 is being absorbed and consequently the current caused by the back electromotive energy flows as an operating current to the absorber 10. This operating current starts flowing only after a time interval from the time that the contacts 9 are opened until the charge stored in the capacitor 11 attains a predetermined value, and its current value is not sufficient to energize the solenoid coil 2 to attract and move the spool but sufficient to light the light emitting diode 12. FIG. 5b shows a modification which another light emitting diode 21 adapted to be lighted by the above-mentioned operating current, is connected in series between a diode 19 and the surge absorber 10. In this way, when the contacts 9 are closed, only the light emitting diode 12 is turned on, and when the contacts 9 are opened the light emitting diode 12 is turned off, after which at the expiration of the previously mentioned interval the light emitting diode 21 is now turned on until the back electromitive force appearing in the circuit is extinguished, that is, for the duration of about 15 m sec after the opening of the contacts in the case of FIG. 4b and this is effected by the operating current flowing to the surge absorber 10. In this case, with the circuit shown in FIG. 5b the voltage value of the generated reverse voltage is determined only by the surge absorber 10, with the result that as regards the reverse withstand voltage, the diode 12 and 16 may be selected in consideration of this reverse voltage and the diodes 19 and 21 may be selected in consideration of the power supply voltage, thus eliminating the need to use diodes having high reverse withstand voltages for these diodes.

Figure 5C:
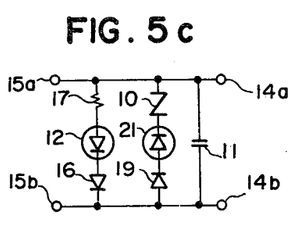
Figure 5D:
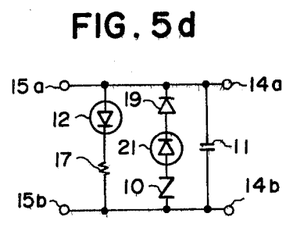
Figure 6A:
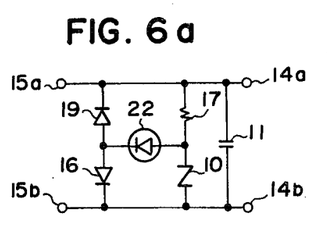
FIG. 6a is a circuit diagram showing an energizing circuit for DC solenoid valve according to still another embodiment of the invention.

With the above-mentioned embodiment, since the lighting of the light emitting diode 21 is indication that a back electromotive force is induced in the solenoid coil 2 in response to the opening of the contacts 9, whether the solenoid coil 2 is functioning normally can be determined in accordance with the production of light from the light emitting diode 21. Particularly, in the case of a hydraulic solenoid valve there is the danger of causing burning loss of the solenoid coil due to any malfunctioning of the valve, and in such case it is possible to check the production of light from the light emitting diode 21 so as to see whether the trouble is the burning loss or faulty connection of the solenoid coil or the coil itself is functioning normally but the valve spool is sticking. In this connection, if the indication is required for this purpose alone, the series circuit comprising the diode 16, the light emitting diode 12 and the resistor 17 may be eliminated in the embodiment of FIG. 5b. Of course, the connecting positions of the diode 19 and the surge absorber 10 may be changed as shown in FIG. 5c. FIG. 5d shows another modification in which the diode 16 is eliminated and the resistor 17 is connected to the cathode of the light emitting diode 12, and the diode 16 can be eliminated in this way. FIG. 6a shows still another embodiment of the invention which differs from the embodiment of FIG. 5b in that the light emitting diodes 12 and 21 are replaced by a single light emitting diode 22. In this case, the indication of normal operation is effected by causing the light emitting diode 22 to light by the current flowing from the resistor 17 through the light emitting diode 22 and the diode 16, and the indication of extinguishing action of the back electromotive force produced upon opening of the contacts 9 is effected by causing the light emitting diode 22 to light for a short period of time by the operating current flowing from the surge absorber 10 through the light emitting diode 22 and the diode 19. As a result, the light emitting diode 22 which has been lighted in response to the closing of the contacts 9 is temporarily turned off in response to the opening of the contacts 9, and after the absorption of the back electromotive force by the capacitor 11 has been completed and the light emitting diode 22 has been forward biased, along with the diode 19, by the operating current to the surge absorber 10, the light emitting diode 22 is again lighted until a point is reached where the operating current decreases sufficiently to turn off the light emitting diode 22.

Figure 6B:
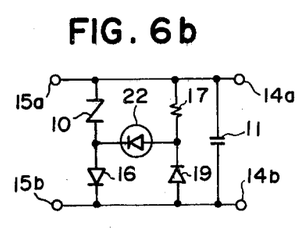
Figure 6C:
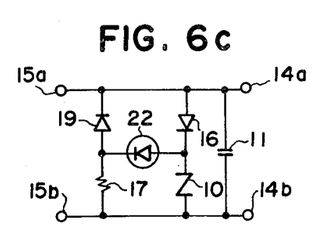
Figure 6D:
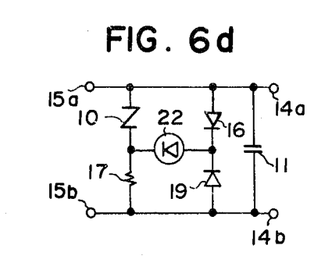

FIG. 6b shows a modification of the circuit shown in FIG. 6a, in which the connecting positions of the surge absorber 10 and the diode 19 are changed with each other. FIG. 6c shows another modification of the circuit shown in FIG. 6a, in which the connecting positions of the resistor 17 and the diode 16 are changed with each other. FIG. 6d shows still another modification of the circuit shown in FIG. 6a, in which the connecting positions of the surge absorber 10 and the diode 19 and those of the resistor 17 and the diode 16 are respectively changed with each other. These changes in the positions of the components practically cause no change in the operation of the circuit, and these changes may be effected as desired depending for example on the arrangement of these components on a printed-circuit board.

While, in the embodiments described so far, the DC power source 20a is used, these embodiments may be modified to operate from an AC power source by making the section between the terminals 15a and 15b nonpolarized with respect to the power source. The embodiment shown in FIG. 7a differs from the embodiments of FIGS. 4d and 4e in that bidirectional diodes 19a, 19b, 19c and 19d are used in place of the diode 19, and these diodes operate in the similar manner as the diode 19. In the Figure, the back electromotive force having a positive potential with respect to the terminal 14a is absorbed by the surge absorber 10 through the diodes 19c and 19b, and the back electromotive force having a positive potential with respect to the terminal 14b is absorbed by the surge absorber 10 through the diodes 19d and 19a.

Figure 7A:
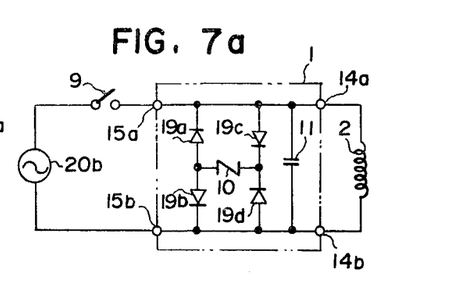
FIG. 7a is a circuit diagram showing an energizing circuit for AC solenoid valve according to still another embodiment of the invention.
Figure 7B:
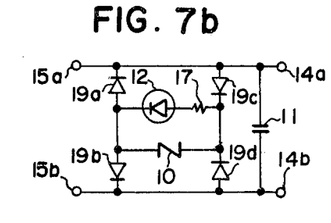

FIG. 7b shows a modification of the embodiment shown in FIG. 7a, in which a light emitting diode 12 is added to indicate the current flow to the solenoid coil 2. In the embodiment of FIG. 7b, the indication is effected by the current flowing from the diode 19d or 19c through the resistor 17, the light emitting diode 12 and the diode 19b or 19a.

Figure 7C:
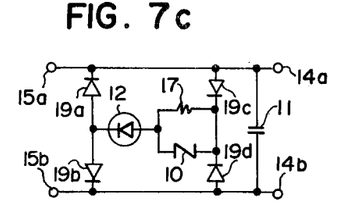

While, in the embodiment shown in FIG. 7b, only the current flow to the solenoid coil 2 is indicated by the light emitting diode 12, the circuit construction shown in FIG. 7c may be used so as to additionally indicate the previously mentioned back electromotive force extinguishing action performed by the surge absorber 10 in response to the opening of the contacts. In FIG. 7c, a parallel circuit of the resistor 17 and the surge absorber 10 is connected in series with the light emitting diode 12, and this series circuit is connected between the junction of the anodes of the diodes 19a and 19b and the junction of the cathodes of the diodes 19c and 19d.

Figure 7D:
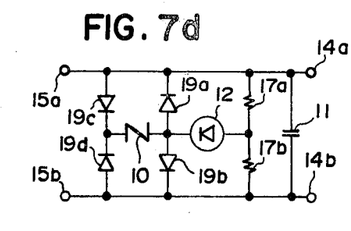
Figure 7E:
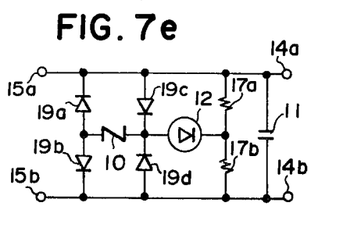

FIG. 7d shows still another modification of the embodiment shown in FIG. 7a, in which the cathode of the light emitting diode 12 is connected to the junction of the anodes of the diodes 19a and 19b, and the anode of the light emitting diode 12 is connected to the terminals 14a and 14b through resistors 17a and 17b, respectively, thereby indicating the current flow to the solenoid coil. FIG. 7e shows a modified form of the circuit shown in FIG. 7d, in which the anode of the light emitting diode 12 is connected to the junction of the cathodes of the diodes 19c and 19d.

Figure 8A:
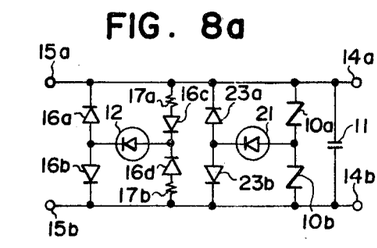
FIG. 8a is a circuit diagram showing an energizing circuit for AC solenoid valve according to still another embodiment of the invention.
Figure 8B:
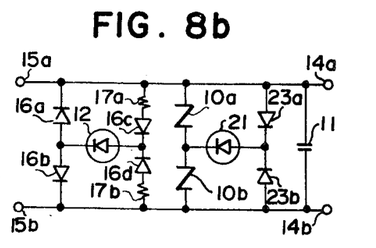

FIG. 8a shows an energizing circuit for an AC solenoid valve according to still another embodiment of the invention, in which two surge absorbers 10a and 10b are connected in series with each other. The current flow indicating light emitting diode 12 is connected in a nonpolarized manner between the terminals 15a and 15b through diodes 16a, 16b, 16c and 16d and resistors 17a and 17b. When the surge absorber 10a or 10b is in operation, this is indicated by another light emitting diode 21 connected in a nonpolarized manner between the terminals 15a and 15b through diodes 23a and 23b. FIG. 8b shows a modification of the embodiment shown in FIG. 8a, in which the light emitting diode 21 is connected in the reverse manner.

Figure 9A:
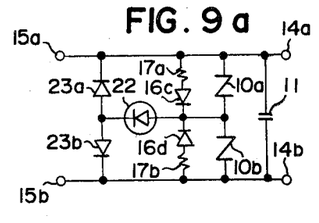
FIG. 9a is a circuit diagram showing an energizing circuit for AC solenoid valve according to still another embodiment of the invention.

FIG. 9a shows still another embodiment of the invention in which the section between the terminals 15a and 15b is also made nonpolarized with respect to the power source. This embodiment differs from the embodiment of FIG. 8a in that the light emitting diodes 12 and 21 are replaced by a single light emitting diode 22. The surge absorber 10a and 10b are connected in series between the terminals 15a and 15b, and the diodes 23a and 23b have their cathodes connected respectively to the terminals 15a and 15b and their anodes connected to each other. The anodes of the diodes 16c and 16d are connected between the terminals 15a and 15b through the resistors 17a and 17b, respectively, and their cathodes are connected to each other. The anode of the light emitting diode 22 is connected to the junction of the surge absorbers 10a and 10b and the junction of the cathodes of the diodes 16c and 16d, and the cathode of the light emitting diode 22 is connected to the junction of the anodes of the diodes 23a and 23b. The capacitor 11 is connected between the terminals 15a and 15b, and the entire circuit assembly is thus incorporated in the terminal box 1 shown in FIG. 3. When the contacts are closed, a lighting circuit for the light emitting diode 22 is provided by the resistor 17a and the diode 16c or the resistor 17b and the diode 16b and the diode 23b or 23a. When the contacts are opened, the resulting back electromotive force from the solenoid coil is discharged through a discharge circuit established by the surge absorber 10a or 10b and the diode 23b or 23a through the light emitting diode 22, and the light emitting diode 22 is lighted again for a short period of time by the operation current flow to the surge absorber 10a or 10b.

Figure 9B:
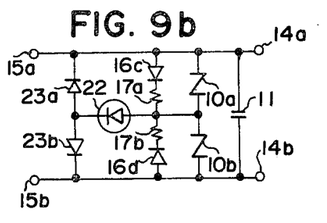
Figure 9C:
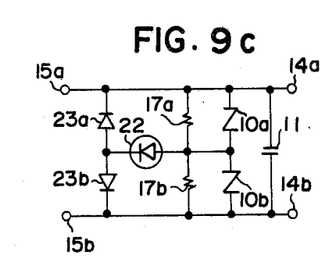
Figure 9D:
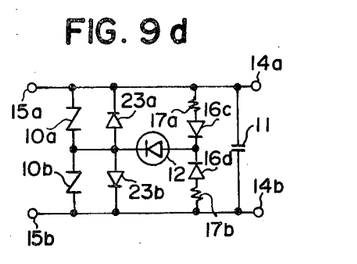
Figure 9E:
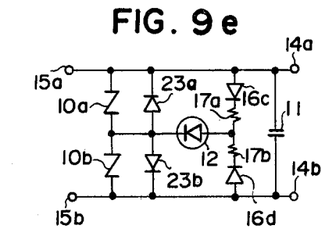
Figure 9F:
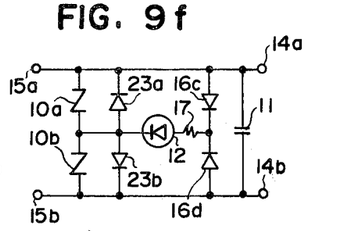
Figure 9G:
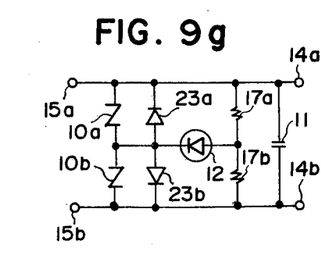
Figure 9H:
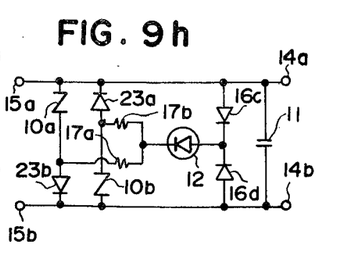

With the embodiment shown in FIG. 9a, the positions of the resistors 17a and 17b and the diodes 16c and 16d may be changed as shown in FIG. 9b, or alternatively the diodes 16c and 16d may be eliminated as shown in FIG. 9c. Also, the embodiment of FIG. 9a may be modified as shown in FIG. 9d in which the junction of the surge absorbers 10a and 10b is connected to the junction of the anodes of the diodes 23a and 23b, thus causing the light emitting diode 12 to indicate only the current flow to the solenoid coil. FIG. 9e shows a modification of the embodiment of FIG. 9d, in which the positions of the resistors 17a and 17b and the diodes 16c and 16d are changed with one another, and the resistors 17a and 17b may be replaced by a single resistor 17 as shown in FIG. 9f. With the embodiment shown in FIG. 9d, the diodes 16c and 16d may be eliminated as shown in FIG. 9g, and also the resistors 17a and 17b may be provided on the cathode side of the light emitting diode 12 as shown in FIG. 9h.

It should be apparent to those skilled in the art that various other changes and modifications are possible to the energizing circuit of this invention without departing from the scope of the invention.

We claim:

1. In an energizing circuit for a solenoid valve having a power source connected to a solenoid coil of the solenoid valve through on-off contacts, the improvement wherein a capacitor and a solid-state surge absorber are respectively connected in parallel with said solenoid coil, said surge absorber being composed of a sintered powder material essentially consisting of a metal oxide, said surge absorber having an electric resistance which is nonlinear with respect to an applied voltage, further comprising a light emitting diode disposed to form a closed series circuit together with the parallel circuit of said solenoid coil and said capacitor and said surge absorber, wherein a series circuit, formed by connecting said light emitting diode and a diode in series with said surge absorber in opposite polarity with respect to said power supply voltage, is connected in parallel with said solenoid coil in addition to said capacitor.

2. In an energizing circuit for a solenoid valve having a power source connected to a solenoid coil of the solenoid valve through on-off contacts, the improvement wherein a capacitor and a solid-state surge absorber are respectively connected in parallel with said solenoid coil, said surge absorber being composed of a sintered powder material essentially consisting of a metal oxide, said surge absorber having an electric resistance which is nonlinear with respect to an applied voltage, further comprising a light emitting diode disposed to form a closed series circuit together with the parallel circuit of said solenoid coil and said capacitor and said surge absorber, wherein said power source is a DC power source, wherein a series circuit of said surge absorber and a resistor is connected in parallel with said capacitor in such a manner that said resistor is connected to a positive terminal of said power source, wherein two diodes are connected in a series circuit relation with each other, said diodes having their anodes connected to each other, the series circuit of said diodes being connected in parallel with said capacitor through the cathodes thereof, and wherein said light emitting diode has its anode connected to a junction of said resistor and said surge absorber, said light emitting diode further having its cathode connected to a junction of the anodes of said diodes.

3. In an energizing circuit for a solenoid valve having a power source connected to a solenoid coil of the solenoid valve through on-off contacts, the improvement wherein a capacitor and a solid-state surge absorber are respectively connected in parallel with said solenoid coil, said surge absorber being composed of a sintered powder material essentially consisting of a metal oxide, said surge absorber having an electric resistance which is nonlinear with respect to an applied voltage, further comprising a first series circuit of two diodes having their anodes connected to each other, said first series circuit being connected in parallel with said capacitor through cathodes of said diodes, and a second series circuit of another two diodes having their cathodes connected to each other, said second series circuit being connected in parallel with said capacitor through anodes of said another diodes, and wherein said surge absorber is connected between a junction of the anodes of the diodes in said first series circuit and a junction of the cathodes of the diodes in said second series circuit.

4. In an energizing circuit according to claim 3, wherein a light emitting diode is connected between said junction of the anodes and said junction of the cathodes in such a manner that a cathode of said light emitting diode is connected to said junction of the anodes.

5. In an energizing circuit for a solenoid valve having on-off contacts connected between a DC power source having a power supply voltage and a solenoid coil of the solenoid valve having a back electromotive energy, a capacitor and a solid-state surge absorber, said capacitor and said surge absorber being respectively connected in parallel with said solenoid coil between said solenoid coil and said contacts, said surge absorber being composed of a sintered powder material essentially consisting of a metal oxide, said surge absorber having an electric resistance which is nonlinear with respect to an applied voltage, the improvement wherein a series circuit, comprising a light emitting diode connected in series with said surge absorber in opposite polarity with respect to said power supply voltage, is connected in parallel with said solenoid coil in addition to said capacitor, said light emitting diode being lighted by a current caused by the back electromotive energy from said solenoid coil when said back electromotive energy is being absorbed by said surge absorber.

6. In an energizing circuit according to claim 5, wherein said series circuit further comprises a diode in series with said surge absorber and said light emitting diode in opposite polarity with respect to said power supply voltage.

7. In an energizing circuit according to claim 6, wherein a series circuit of said surge absorber and a resistor is connected in parallel with said capacitor in such a manner that said resistor is connected to a positive terminal of said power source through said contacts, wherein said diode is connected to another diode in a series circuit relation with each other, said diodes having their anodes connected to each other, the series circuit of said diodes being connected in parallel with said capacitor through the cathodes thereof, and wherein said light emitting diode has its anode connected to a junction of said resistor and said surge absorber, said light emitting diode further having its cathode connected to a junction of the anodes of said diodes.

8. In an energizing circuit according to claim 6, wherein a series circuit of said diode and a resistor is connected in parallel with said capacitor in such a manner that said resistor is connected to a positive terminal of said power source through said contacts and an anode of said diode is connected to a negative terminal of said power source, wherein a series circuit of said surge absorber and another diode is connected in parallel with said capacitor in such a manner that said surge absorber is connected to a positive terminal of said power source through said contacts and a cathode of said another diode is connected to a negative terminal of said power source, and wherein said light emitting diode has its anode connected to a junction of said resistor and a cathode of said diode, said light emitting diode further having its cathode connected to a junction of said surge absorber and an anode of said another diode.

9. In an energizing circuit according to claim 6, wherein a series circuit of said diode and a resistor is connected in parallel with said capacitor in such a manner that a cathode of said diode is connected to a positive terminal of said power source through said contacts and said resistor is connected to a negative terminal of said power source, wherein a series circuit of said surge absorber and another diode is connected in parallel with said capacitor in such a manner that an anode of said another diode is connected to a positive terminal of said DC power source through said contacts and said surge absorber is connected to a negative terminal of said power source, and wherein said light emitting diode has its anode connected to a junction of said surge absorber and a cathode of said another diode, said light emitting diode further having its cathode connected to a junction of said resistor and an anode of said diode.

10. In an energizing circuit according to claim 6, wherein a series circuit of said surge absorber and a resistor is connected in parallel with said capacitor in such a manner that said surge absorber is connected to a positive terminal of said power source through said contacts, wherein said diode is connected to another diode in a series circuit relation with each other, said diodes having their cathodes connected to each other, the series circuit of said diodes being connected in parallel with said capacitor through the anodes thereof, and wherein said light emitting diode has its anode connected to a junction of the anodes of said diodes, said light emitting diode further having its cathode connected to a junction of said resistor and said surge absorber.

11. In an energizing circuit according to claim 6, wherein a series circuit of said surge absorber and another surge absorber is connected in parallel with said capacitor, wherein said diode is connected to another diode in series circuit relation in opposite polarity with each other, the series circuit of said diodes being connected in parallel with said capacitor, and wherein said light emitting diode is connected between a junction of said surge absorber and said another surge absorber, and a junction of said diodes, in the same direction with respect to said diodes.

12. In an energizing circuit according to claim 11, wherein two resistors are connected in a series circuit relationship with each other, the series circuit of said resistors being connected in parallel with said capacitor, a junction of said resistors being connected to said junction of said surge absorber and said another surge absorber.

13. In an energizing circuit for a solenoid valve having on-off contacts between a power source and a solenoid coil of the solenoid valve, a capacitor and a solid-state surge absorber, said capacitor being connected in parallel with said solenoid coil between said solenoid coil and said contacts, said surge absorber being composed of a sintered powder material essentially consisting of a metal oxide, said surge absorber having an electric resistance which is nonlinear with respect to an applied voltage, the improvement comprising a first series circuit of two diodes having their anodes connected to each other, said first series circuit being connected in parallel with said capacitor through cathodes of said diodes, and a second series circuit of another two diodes having their cathodes connected to each other, said second series circuit being connected in parallel with said capacitor through anodes of said another diodes, and wherein said surge absorber is connected between a junction of the anodes of the diodes in said first series circuit and a junction of the cathodes of the diodes in said second series circuit, wherein a light emitting diode is connected between said junction of the anodes and said junction of the cathodes in such a manner that a cathode of said light emitting diode is connected to said junction of the anodes, wherein said light emitting diode is connected in series with said surge absorber.

* * * * *